May 1, 1951  J. H. GARTNER  2,551,370
COMPRESSION TRIGGER
Filed Feb. 15, 1947  6 Sheets-Sheet 1
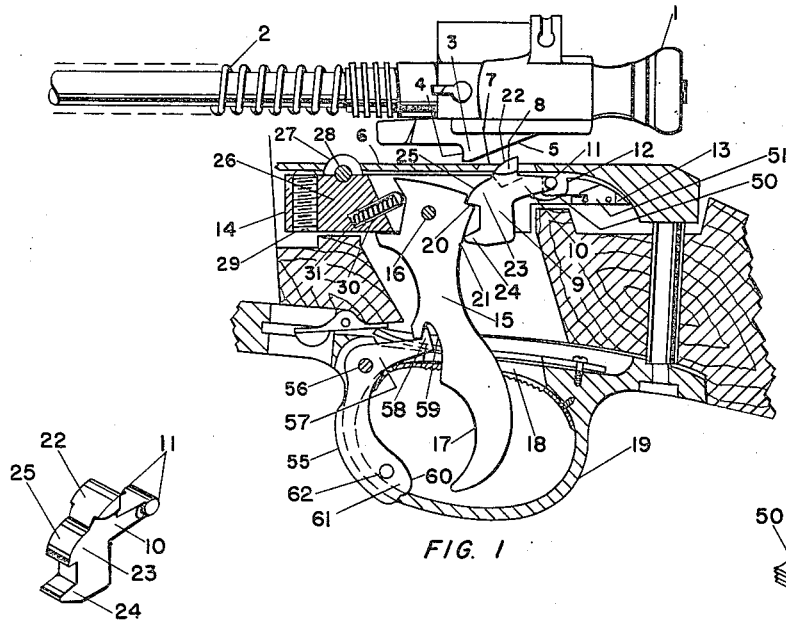
FIG. 1
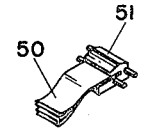
FIG. 5
FIG. 6
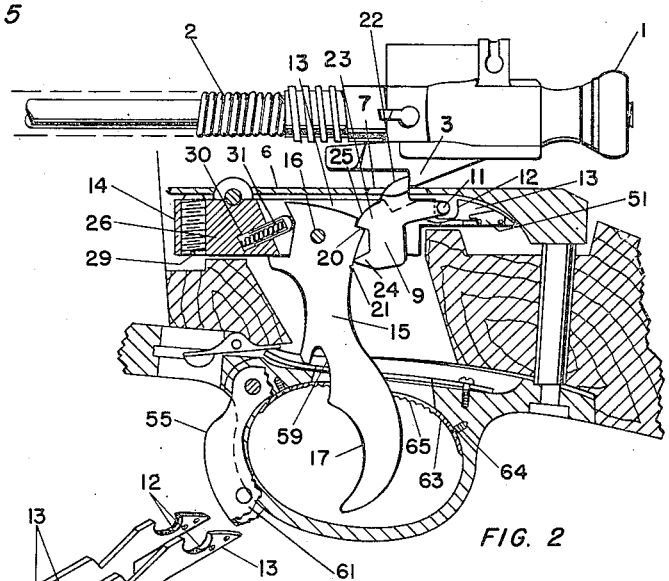
FIG. 2
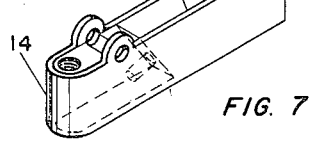
FIG. 7
INVENTOR.
JOHN H. GARTNER
BY
Boyken, Mohler & Beckley
ATTORNEYS.

May 1, 1951    J. H. GARTNER    2,551,370
COMPRESSION TRIGGER
Filed Feb. 15, 1947    6 Sheets-Sheet 2

INVENTOR.
JOHN H. GARTNER
BY
Boyken, Mohler & Beckley
ATTORNEYS

May 1, 1951 J. H. GARTNER 2,551,370
COMPRESSION TRIGGER
Filed Feb. 15, 1947 6 Sheets-Sheet 3

INVENTOR.
JOHN H. GARTNER
BY
Boyken, Mohler & Beckley
ATTORNEYS.

May 1, 1951  J. H. GARTNER  2,551,370
COMPRESSION TRIGGER

Filed Feb. 15, 1947  6 Sheets-Sheet 5

INVENTOR.
JOHN H. GARTNER
BY
Boyken, Mohler & Beckley
ATTORNEYS.

May 1, 1951 J. H. GARTNER 2,551,370
COMPRESSION TRIGGER
Filed Feb. 15, 1947 6 Sheets-Sheet 6

INVENTOR.
JOHN H. GARTNER
BY
Boyken, Mohler & Beckley
ATTORNEYS.

Patented May 1, 1951

2,551,370

UNITED STATES PATENT OFFICE 2,551,370

COMPRESSION TRIGGER

John H. Gartner, Kentfield, Calif., assignor to Samuel I. Keene, San Francisco, Calif.

Application February 15, 1947, Serial No. 728,781

9 Claims. (Cl. 42—69)

This invention relates to trigger mechanisms for small firearms and has for one of its objects the provision of trigger mechanism that is simple, safe, easy to actuate, and that is adapted to operate in a manner that will enable a relatively unskilled person to obtain a high degree of accuracy in shooting within a shorter period of time than heretofore and with far less practice and instruction.

Another object of the invention is the provision of a trigger mechanism in combination with a cocking piece that is adapted to be operated in a manner that will enable the user to obtain the desired benefits of a hair trigger within the rules governing national matches, and without the hazards that exist with hair triggers.

A still further object of the invention is the provision of a trigger mechanism in combination with a cocking piece that is adapted to operate in a manner that substantially eliminates the objectionable mental and physical tension that is created where a relatively long retraction of the trigger under a three to four pound force is required to effect a release of the cocking piece without a sensible indication to the user of the point during such retraction at which such release will occur.

An additional object of the invention is the provision of a trigger mechanism including a trigger actuatable sear that releasably holds the cocking piece cocked against release except by actuation of the trigger, in which said sear safely holds the cocking piece cocked against accidental release thereof by jar, impact, or any other accidental occurrence irrespective of any movement of the trigger other than a consciously directed and purposely effected finger movement that includes the application of a necessary and substantial force on the trigger by the trigger finger for moving the trigger past a predetermined point that is within its range of movement.

This particular invention contemplates a trigger mechanism of the "compression" type, or one in which the release of the cocked and sear held cocking piece is effected by application of an increased compressive force or a positively directed muscular force by the trigger finger on the trigger as compared with a mechanism in which a relaxation of the compressive force, after a retraction of the trigger, effects a release of the cocking piece. The term "cocking piece" is intended to cover a hammer, bolt or other spring held element in association with the firing pin, the release of which causes the firing pin to strike the percussion cap for detonating the powder in the cartridge or shell. In bolt action firearms, however, where the sear nose engages a sear notch on the bolt, there are certain added advantages by use of this invention, as will later be described, and which advantages are present in any similar sear arrangement.

In the past there has been substantial unanimity among instructors in the art of shooting small firearms, that the marksman should follow a certain set procedure in order to obtain the best results, namely:

When the sight picture is correct the trigger squeeze is begun and if the sights should move away from the target the amount of trigger compression that has been made is held and no additional pressure put on the trigger. The sights are then brought back upon the target and when the sight picture is correct, additional pressure is applied. Should the sights again wander off the target, the same procedure is followed. If a steady pressure is maintained upon the trigger at the moment that the sight picture is correct, the target will be hit. The marksman does not need to know, or should not know, when the firearm is to be discharged.

Other instructions, such as holding a deep breath, etc., during the aiming and trigger squeeze are added to the above.

Under the above method of instruction, which is taught in the drill regulations of the armies of all countries, the fact is impressed upon the novice and expert alike that he does not need to know and should not know the point at which the firearm will be discharged.

He is instructed to devote his attention to obtaining and maintaining the sights in alignment onto the objective.

With conventional trigger mechanisms the above method of instruction might, to some degree, be understandable. The trigger pull must be over three pounds in national matches (eliminating the "hair trigger"), and there is no indication during the retraction of the trigger of the point where the sear will release the cocking piece. The conventional sear notch element and sear nose are usually in sliding engagement, and the sear nose slides against one side of the sear notch element as the trigger is retracted. The firing point is that point where the nose finally slides off the sear notch element, the latter being carried by the cocking piece. If the trigger should be released before the sear nose slides off the sear notch element, the sear nose may or may not slide back to its normal position. If it does not return, which happens many times, then a mere jar may cause the nose to slide off the sear notch element resulting in an accidental firing of the firearm.

With the present invention no such accidental firing is possible and no reliance is placed on a sear spring for restoring the sear nose to a prior position if the operator should decide not to fire the firearm after a preliminary retraction of the trigger. Instead, the main spring that actuates the cocking piece causes the sear to move out of engagement with the sear notch element after a predetermined movement of the trigger, and this spring, which has substantially a 14 pound force in the 1903 model U. S. Springfield rifle, will cause a fast and irrevocable release of the cocking piece when the trigger has reached a predetermined point in the manipulation thereof. Thus the safety feature in applicant's invention is an important one and is one of the objects of the invention.

Notwithstanding the conventional instructions relating to the "trigger squeeze" movement, and the admonition that the marksman should not know, and need not know, in advance, when the cocking piece is to be released and the firearm fired, the expert marksman actually knows by long experience and familiarity with firearms he uses exactly when a further movement of the trigger, after a preliminary retraction, will effect a firing of the firearm. However, the conventional "trigger squeeze" theory has apparently been generally adopted as being most suitable to limitations of the conventional trigger mechanism where the operator has neither the time nor the skill essential to acquiring the familiarity and experience of the expert.

One of the advantages of the present invention is that the trigger mechanism is of the type that eliminates the seeming necessity for highly questionable and traditional practice of "squeezing" the trigger in accordance with the conventional teaching. The trigger mechanism is such that no skill is required to bring the trigger to the point where a slight additional force will effect a release of the cocking piece, and which mechanism includes means that will enable the operator to maintain the trigger at said point free from nervous or muscular tension. Thus, the operator can cause a release of the cocking piece at the instant the sights are aligned with the objective without resorting to the traditional "trigger squeeze" manner of operation. This can be done in less than one-twentieth of a second, whereas by the trigger squeeze method at least one and one-half seconds is required when firing from a standing position.

The traditional instructions and the conventional mechanisms heretofore used require the operator to "maintain" the pressure on the trigger when the sights waver off the objective during the "trigger squeeze" operation. The novice, and many others, retract the trigger by pulling on it at a point about centrally of the convex curve of the trigger. The pull is fairly easy at this point due to the law of leverages and becomes easier if the finger is nearer the lower outer end of the trigger. However, in following the traditional instructions, it is obvious that where the trigger finger is out in the open attempting to "maintain" the trigger stationary against the variable force of the spring that a considerable anxiety neurosis will occur. The average rifleman will tend to release the trigger partially rather than chance causing a release of the cocking piece by an unintentional fractional increase in the pressure. Such a condition is bound to be fatal to the best results, and the least that can be said against it is that it is harrowing on the nerves of the operator. To overcome this condition to some degree, many of the experts are what might be called "high pullers" on the trigger. Thus, the forefinger or trigger finger slides along the base of the chamber in which the trigger mechanism is enclosed, and is positioned high on the trigger whereby the operator is enabled to easily hold the trigger stationary when it is partially retracted by pressing the finger on said base so as to snub movement of the finger by resistance or friction. Little force is required to hold the trigger steady when this is done even though greater force is required to retract the trigger.

The present invention is designed to facilitate this holding of the trigger in partially retracted position when it is being manipulated by a so-called "high puller," but which invention also facilitates the holding of the trigger stationary at the desired point by a medium or low puller.

Hereinbefore it has been mentioned that the use of so-called "hair triggers" is not permitted in national matches. The trigger pull must be over three pounds to qualify the firearm. The unquestionable accuracy obtained by users of hair triggers illustrates the desirability of the marksman knowing exactly when the firepiece is to be fired. The employment of the traditional and present "trigger squeeze" theory is impossible with the hair trigger. However, the use of hair triggers is so dangerous that they are used only for trick shooting and where safety is not a factor. The present invention provides structure whereby the prescribed force of three pounds is required to release the cocking piece, yet the illusion is created that the pull is much less, and the desired benefits of the hair triggers are obtained but with the maximum of safety that far exceeds the safety factor present in conventional firearms.

An object of the invention is to provide a safe trigger mechanism that has all the virtues of a "hair trigger." Hair triggers are too dangerous for military use, but it is a well known fact that a hair trigger improves marksmanship, for the simple reason that at the instant the sight picture is correct the firearm can be discharged without accidentally moving it. This invention becomes a hair trigger only after over three pounds of pressure has been applied to the trigger. The marksman then knows definitely that he is in static tension and that the piece can be discharged on the instant the sight picture is correct.

In the drawings, Fig. 1 is a part-sectional and part-elevational view of one form of the improved trigger mechanism showing the same in a position preparatory to cocking the same.

Fig. 2 is a view showing the mechanism of Fig. 1 in cocked position.

Fig. 5 is a perspective view of the sear alone.

Fig. 6 is a perspective view of a spring that is normally associated with the sear.

Fig. 7 is a perspective view of a U-shaped member that supports the sear at one of its ends and which member adapts the present mechanism to a standard U. S. Springfield rifle.

Figure 8:
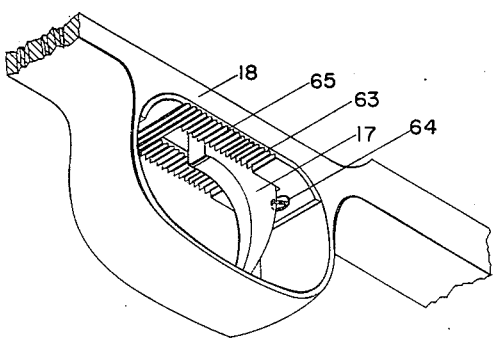

Fig. 8 is an enlarged perspective view of a plate that is preferably employed at the upper side of the trigger guard, said view including a fragment of the rifle.

Figure 9:
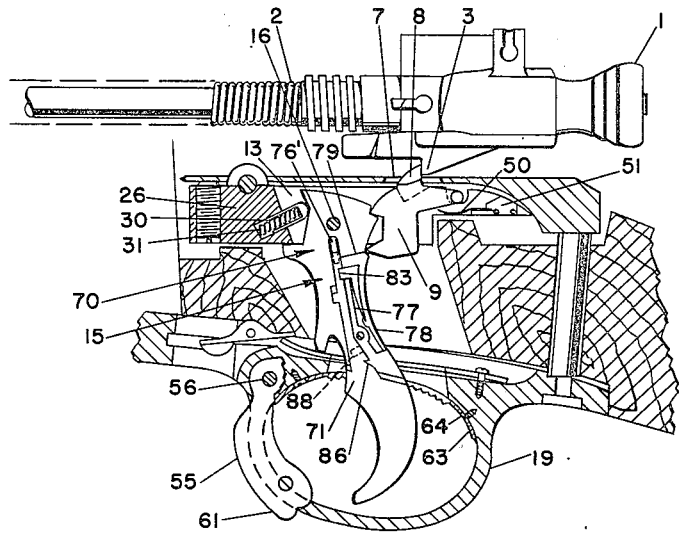

Fig. 9 is a part-sectional, part-elevational view of a modified form of the invention that is illustrated in Figs. 1 to 8, inclusive, in which the trigger is in its normal forward position and the cocking piece is cocked.

Figure 10:
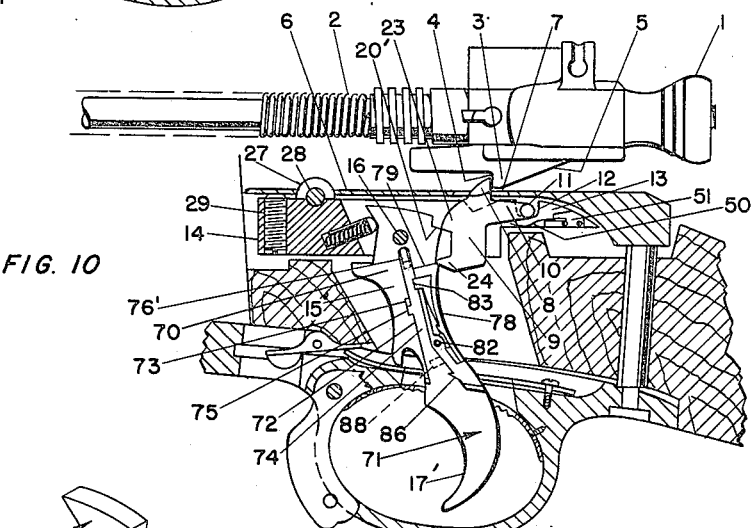

Fig. 10 is a view showing the mechanism of Fig. 9, but with the trigger retracted to the point where an upward movement of the latter will cause a firing of the piece.

Figure 11:
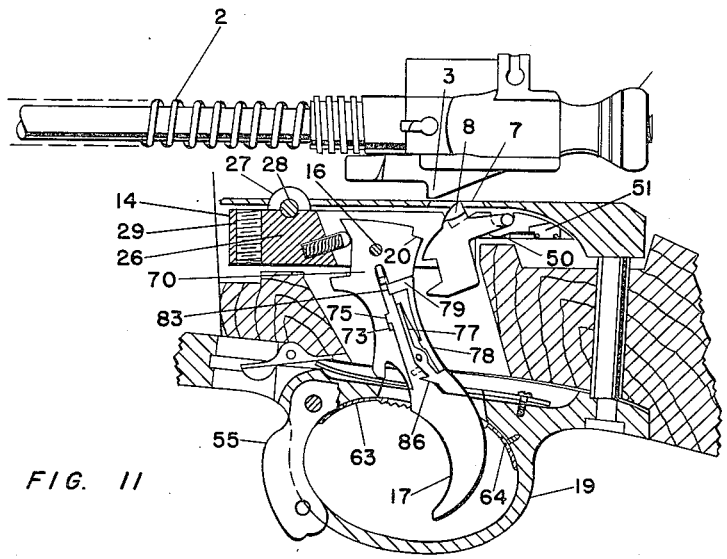

Fig. 11 is a view showing the trigger elevated and the sear rotated to a position in which it has fully released the cocking piece, the latter being shown in its forward position following such release.

Figures 12, 13, 14, 15:
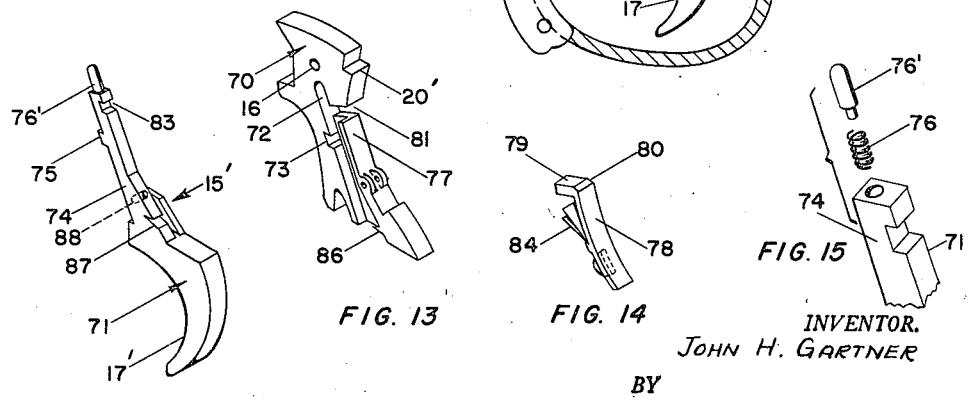

Fig. 12 is a perspective view of the lower portion of the trigger.

Fig. 13 is a perspective view of the upper portion of the trigger.

Fig. 14 is a perspective view of a portion of the trigger that is adapted to be carried by the portion shown in Fig. 13.

Fig. 15 is an enlarged exploded perspective view of the uppermost part of the trigger portion shown in Fig. 12 with the elements thereof separated.

Figure 16:
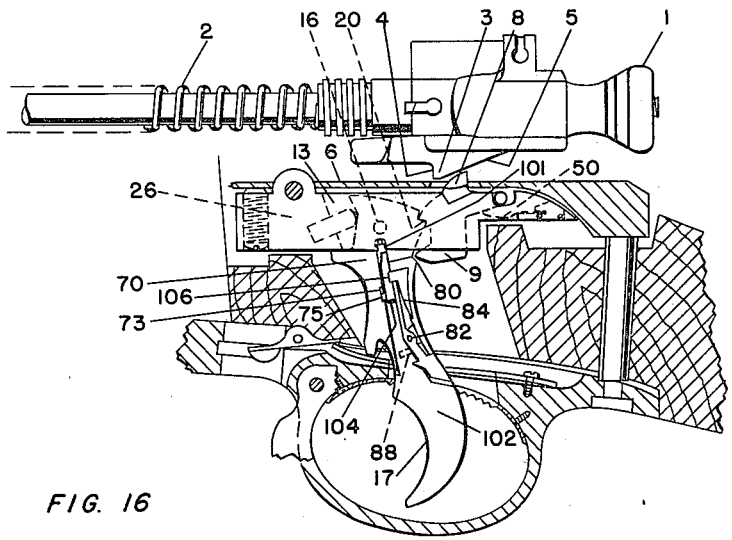

Fig. 16 is a part-sectional, part-elevational view of a still further modified form of the invention, that is slightly different from that of Figs. 9 to 15. In this view the piece is uncocked and the trigger is in its normal forward position.

Figure 17:
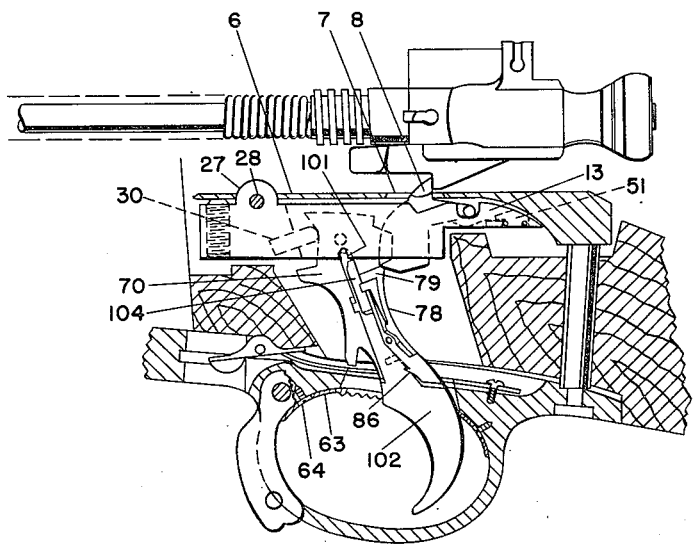

Fig. 17 is a view similar to that of Fig. 16 showing the cocking piece cocked and the trigger fully retracted.

Figure 18:
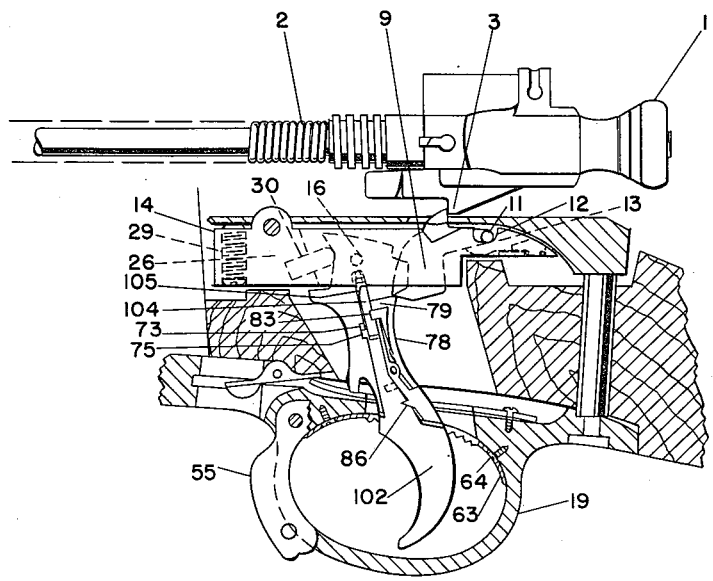

Fig. 18 is a view similar to that of Fig. 17, but with the trigger moved forwardly to a position in which an upward movement of the latter will effect a release of the sear and cocking piece.

Figure 19:
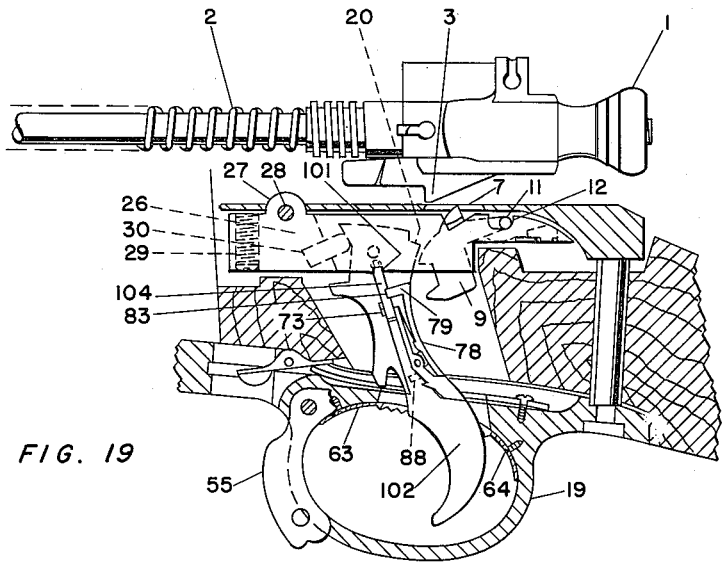

Fig. 19 is a view similar to that of Fig. 18 except that the trigger has been moved upwardly and the sear is shown rotated to a position releasing the cocking piece. The cocking piece is shown in its forward position after such release.

Figures 20, 21:
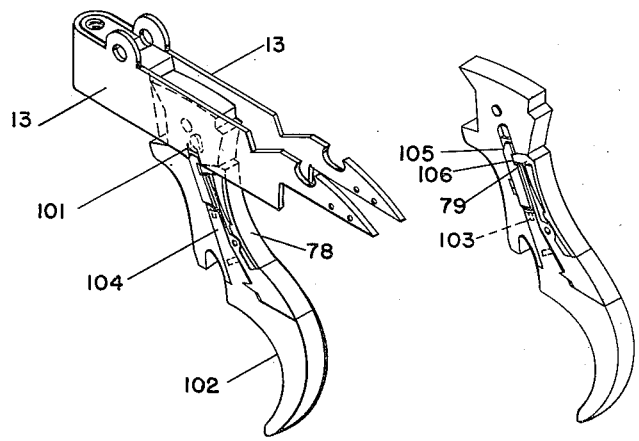

Fig. 20 is a perspective view of the assembled trigger.

Fig. 21 is a perspective view of the trigger and the U-shaped adapter that in this case cooperates with the trigger for permitting firing of the firearm.

Figure 22:
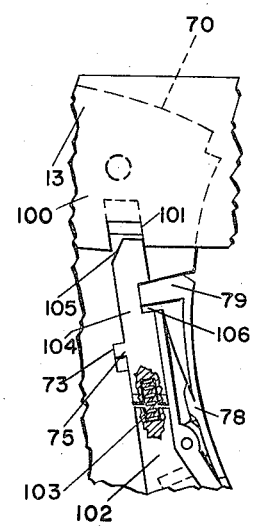

Fig. 22 is an enlarged fragmentary part-sectional and part-elevational view of part of the trigger mechanism of Fig. 21.

Three different forms of the invention are hereinafter shown and described. Many other modifications are possible, but from the standpoint of simplicity of operation and economy of manufacture, these three forms are deemed preferable.

The form illustrated in Figs. 1 to 8 is one in which the trigger is retracted to a predetermined point against a three to four pound resistance and the sear is moved linearly. At said point a noticeable resistance is encountered, which indicates that a slight further retraction of the trigger will cause a release of the sear, which release is instantaneous, the sear being revolved under the influence of the main spring that drives the cocking piece in releasing the latter.

In Figs. 9 to 15 the trigger may be fully retracted without effecting a release of the cocking piece. The sear moves substantially in translation during this retraction. A slight upward force on the trigger by the trigger finger will effect the release of the sear from the cocking piece and the sear revolves out of engagement with the cocking piece in releasing the latter, exactly as in the instance of Figs. 1 to 8.

In Figs. 16 to 22 the same procedure is followed as in the case of Figs. 9 to 15, except that the trigger is moved forward from fully retracted position to a "tell tale" or point of increased resistance, and then at that point an upward movement of the trigger will effect release of the cocking piece.

In detail, referring to Fig. 1, the bolt of the rifle is indicated at 1. The bolt so illustrated is the conventional bolt employed in the U. S. Springfield rifle and is constantly urged to fired position by the usual coil spring 2, which spring exerts a force of about fourteen pounds throughout its range of operation.

The bolt 1 is reciprocable longitudinally thereof and conventional means (not shown) support the same for reciprocation from cocked position (Fig. 2) at one extreme end of its stroke to fired position (Fig. 1) at the other end of said stroke.

Depending from the underside of bolt 1 and integral with the latter is a sear notch element 3 that is conventional in this type of firearm. This element 3 is more or less in the form of a tooth having a flat forwardly directed face 4 at right angles to the direction of travel of the bolt and element and an upwardly and rearwardly inclined face 5 extending from the outer end of the element to the bolt proper.

Bolt 1 and the element 3 thereon are disposed directly over the usual partition 6 that is between the bolt and the trigger mechanism, which partition forms the upper wall of the housing for said mechanism.

The partition 6 is formed with an opening 7 through which projects the nose 8 of a sear 9.

The main body of sear 9 is more or less horizontally elongated with said nose 8 projecting upwardly from a point intermediate its front and rear end portions.

In using the terms "front," "rear," "forward," "forwardly," "rearwardly," etc., the same are used with respect to the rear or butt end of the rifle and the forward or muzzle end thereof. Thus, a rearwardly extending element extends generally toward the butt end and a forwardly extending element extends toward the muzzle end.

The rear end portion 10 of sear 9 terminates in a pair of laterally oppositely outwardly directed cylindrical projections 11 (Figs. 1, 5) that extend into upwardly opening horizontally elongated similar recesses 12 formed in the upper edges of a pair of opposed horizontally directed arms 13 of a generally U-shaped member (Fig. 7). The closed end of said U-shaped member is indicated at 14 (Fig. 7) and is at the forward end thereof while the edges of the arms at their free rear ends are curved as indicated in Fig. 1 to follow the downwardly curved contour of the partition 6.

The projections 11 form a support for sliding of sear 9 longitudinally of arms 13 and for pivotal movement of the sear about the horizontal axis of said projections upon actuation of the trigger, as will later be explained more in detail.

Forwardly of sear 9 is the upper portion of a trigger 15 which upper portion extends between arms 13. A horizontal pin 16 extends through the said upper portion and into openings in arms 13 pivotally supporting said trigger for revolvable movement about the axis of said pin.

The portion of trigger 15 that projects downwardly from arms 13 terminates at its lower end in the conventional curved finger engaging portion 17 that projects through the floor plate 18 that is integral with the guard bow 19 for the trigger and that is at the upper end of said bow. The said portion 17 projects downwardly into the area or space enclosed within said guard bow for engagement by the finger of an operator in the usual manner.

The rear face of the upper portion of trigger 15 that is between arms 13 is formed with an upper notch providing an upwardly facing ledge 20.

Spaced below said ledge 20 is a transversely extending relatively shallow groove 21.

The rear face of sear nose 8 is flat and is substantially vertical and is adapted to engage the forward side 4 of the sear notch element 3 when the bolt is in cocked position. The upper and forward face of said nose 8 is curved as indicated at 22 to facilitate the sliding of the inclined lower surface 5 of the sear notch element 3 rearwardly over said curved surface in cocking the bolt.

The forward side of the sear 9 is formed with a forwardly opening recess, the upper side of which starts aa the lower end of convexly curved surface 25 that extends forwardly of curve of surface 22, whereby the upper curved surface 25 and the upper side of said recess define two sides of an upper nose 23, (Fig. 5). The lower side of said recess defines the upper side of a lower nose 24, the lower side of which lower nose is the lower side of said sear. Said lower side is preferably convexly curved from front to rear and the lower nose 24 is preferably slightly longer than upper nose 23 and the upper side of lower nose 24 preferably extends slantingly downwardly toward the point of said lower nose.

When the fireman has been fired and the bolt is uncocked and trigger 17 is in forward position, the upper nose 23 extends over the upper ledge 20 in the rear side of trigger 15 and the lower nose 24 extends to a point above groove 21 and below ledge 20 with a slight space between the lower nose and said groove, (Fig. 1).

Forwardly of the upper portion of trigger 15 and between said upper portion and the forward end 14 of the U-shaped member is a block 26 that is preferably formed integrally with said member. In Fig. 7 block 26 is shown as being formed separately from and secured in the U-shaped member as an alternative arrangement to that shown in the other views.

The partition 6 is formed with an opening over said U-shaped member and the U-shaped member is formed with upwardly projecting ears 27 that extend through said opening. A pin 28 secures the U-shaped member and consequently block 26 to the partition, said pin being the conventional sear pin used in the standard rifle for pivotally supporting the conventional sear. The present structure substitutes the U-shaped member and block 26 for the conventional sear and the pin 28 is merely used to hold the U-shaped member and block in position.

A screw 29 extends through the block adjacent the end member 14 of the U-shaped frame. The lower end of said screw is slotted for a screw driver.

The side of block 26 adjacent the upper end of the trigger 15 is formed with a recess 30 for a spring 31 that is adapted to react between the upper end of said trigger and said block for returning the trigger to forward position of its lower end after the firearm has been fired, and for yieldably holding said trigger in said forward position.

The sear nose 8 is normally held elevated by means of a plurality of thin spring leaves 50 (Fig. 6) that are secured at their forward edges to a cross piece 51 extending between and secured to the rear ends of arms 13. The forward edges of said leaves wipingly engage the underside of the forward projection 10 of the sear 9.

Referring to Fig. 1 in which the bolt is in uncocked position, it will be seen that a retraction of the bolt to cocked position will cause the sear notch piece 3 to move over the sear nose 8, depressing the latter against the resistance of the spring leaves 50 until the said piece 3 clears the nose, after which said sear nose 8 will move up to hold the trigger cocked.

It is pertinent to note that the spring 50 does not function to move the sear upwardly against any resistance other than gravity. It is not "bucking" frictional resistance or any force caused by another spring.

Upon retracting the trigger, the first action is that of causing upper sear nose 23 to slide off the shoulder 20 and to cause engagement of the rounded end of lower nose 24 in notch 21 (Fig. 3), at which point there is an audible click and a noticeable increase in resistance to the retroactive force required by the trigger finger if the retraction of the trigger is to continue. Should the trigger be released without further retraction, the upper nose 23 will merely be returned to its position on ledge 20. This return is under the influence of the heavy spring 2, which normally has about a fourteen pound force, so there is no question as to its being fully returned. On the other hand, should the operator wish to fire the piece, a further retraction of the trigger will result in moving the sear slightly rearwardly (which is permitted by recess 12 in which projections 11 are positioned) and upwardly, until the lower nose 24 moves out of the notch 21 in a counter-clockwise direction, as seen in Fig. 4. This rotation of the sear is under the influence of spring 2 and is extremely fast, but until the rotative action has occurred, there is substantially no dislodgement or movement of the sear nose 8 out of its almost full engagement with the surface 4 of the sear notch 3. Thus, the firearm cannot be accidentally discharged by a jar, as is possible and as occurs in the conventional structure where the sear is gradually moved out of engagement with the sear notch.

While I have mentioned above that there is no substantial movement of the sear nose toward the point where the sear will release the cocking piece during retraction of the trigger to the point where the cocking piece is released, it is pertinent to note that from a three to a four pound pull on the trigger is required to effect the release of the cocking piece, and this pull is directly against the spring 2 that drives the cocking piece and firing pin. The spring 50 exerts a negligible effect, being merely required to insure raising the sear against the force of gravity.

Figure 3:
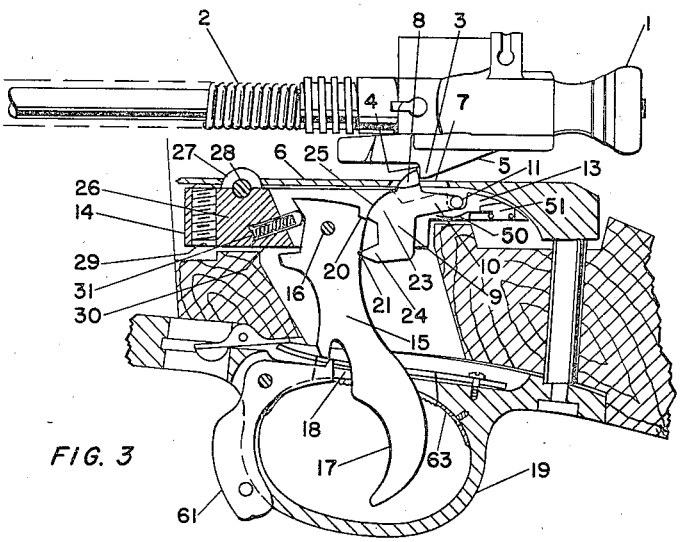
Fig. 3 is a view showing the mechanism of Fig. 2 with the trigger retracted to the point where further retraction would effect firing.
Figure 4:
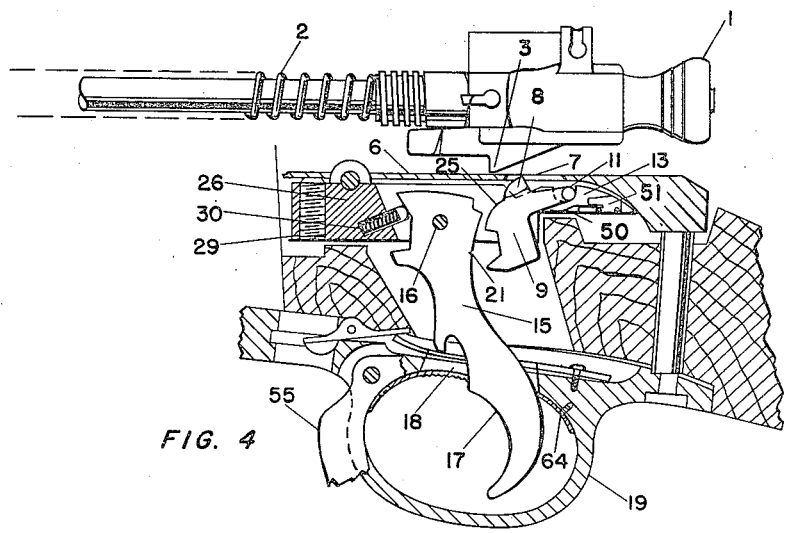
Fig. 4 is a view showing the mechanism of Fig. 3 with the trigger retracted fully and the sear rotated to release the cocking piece.

If the operator does not wish to fire the firearm after a retraction of the trigger to the point where its further movement will cause such firing, the sear is returned from the position shown in Fig. 3 back to the position shown in Fig. 2 by the force of spring 2, and not by spring 50 or by spring 31, the latter merely being required to return the trigger to the position seen in Fig. 1 when the trigger finger is off the trigger. Thus, it will be evident that the strong spring 2 is the tical with the corresponding elements shown in Figs. 1 to 8.

The trigger structure varies from that shown in the invention already described in certain features, but the upwardly facing ledge 20 is the same as in Figs. 1 to 8.

The trigger in Figs. 9 to 15 is generally designated 15', the same as in Figs. 1 to 8, but in the modified form of the invention said trigger is in two main parts, one being the upper part, which is generally designated 70 and which has the shoulder 20', and the other is the lower part, generally designated 71, which has the finger engaging portion 17' (Fig. 12).

The said upper part 70 is pivotally supported on pivot 16 which is identical with pivot 16 of Fig. 1, and just below said pivot one side of said part 70 is recessed to form a vertically extending guideway 72 (Fig. 13) having a short recess 73 in one of its sides.

The lower part 71 is formed with a vertically elongated portion 74 (Fig. 12) at its upper end that is adapted to fit in said guideway for sliding longitudinally of the latter, but a projection 75 on one side of said portion 74 is adapted to be received in recess 73, which projection limits the vertical movement of part 71 to a distance equal to the distance that projection 75 is adapted to move in recess 73.

The conventional side plate adapted to extend over the near side of the housing portion enclosing the trigger mechanism is not shown, but said plate, when in position, prevents part 74 of the lower part 71 of the trigger from moving laterally out of the guideway 72 in part 70. The projection 75 on the side of portion 74 prevents the lower portion 71 from movement longitudinally of the guideway 72 out of the latter. In this manner parts 15', 71 and 77 are held together in assembled relation.

A spring 76 (Fig. 15) is carried in a recess in the upper end of portion 74 axially of said portion and reacts against the upper closed end of guideway 72 to yieldably hold the part 71 at the lowermost end of its movement. A pin 76' is between said closed end and said spring, although the spring itself could engage said end.

A laterally projecting wall 77 on upper part 70 (Fig. 13) defines the rear side of recess 72 and alongside the rear side of said wall is a generally vertically extending strip 78 (Figs. 10, 14) that is formed at its upper end with a forwardly directed lip 79, while the rearwardly facing side of said strip is concavely curved. The outside corner of the juncture between lip 79 and the strip is bevelled to form a generally rearwardly and upwardly facing surface 80. As will later be seen, the degree of inclination of said surface controls, to a great extent, the sensitivity of the sear release, for this surface engages the lower nose 24 of the sear to prevent rotation of the latter out of engagement with sear notch member 3 until the said surface is moved.

A gap 81 between the upper end of wall 77 (Fig. 13) and the main body of part 70 above said wall, is adapted to pass the lip 79 and the strip 78 is pivotally secured adjacent its lower end to wall 77 by a pivot 82 (Fig. 10) for swinging of the lip 79 through said gap.

The upper end portion 74 of part 71 is formed with a rearwardly directed recess 83 into which the lip 79 is adapted to move when said part 71 is raised to bring said recess 83 opposite lip 79. A leaf spring 84 is carried by strip 78 between said strip and wall 77 for tending to constantly urge the lip 79 in a direction outwardly through gap 81. Since the recess 83 in said portion 74 is normally just enough below lip 79 to enable a very slight upward movement of part 71 to bring recess 83 into registration with the lip 79, it will be seen that the slanted surface 80 on this upper end of strip 78 will project rearwardly a sufficient distance to provide a shoulder that will block free counter-clockwise rotation of sear 9 (as seen in Fig. 10).

Spaced a substantial distance below pivot 82 the forward side of wall 77 is formed with a spur or tooth 86 (Fig. 13) and a complementary formed recess 87 is formed in the rear side of part 71 (Fig. 12) of the trigger. This recess is adapted to receive said tooth when the trigger finger of the operator retracts lower part 71 of the trigger, thus locking the part 71 with wall 77 so that said part 71 will not move upwardly under a direct rearward pull of the trigger even though the operator might be what is known as a "high puller" or one that pulls on the trigger close to the upper side of the trigger guard.

A small coil spring 88 held in a recess in the lower part 77 reacts between the wall 77 and part 71 to tend to urge the lower part 71 forwardly at all times relative to that portion 77 of part 70 that is engaged by said spring, and the fitting of the portion 74 in recess 72 is such as to allow for a slight rocking of the part 71 relative to part 70 and consequent compression and expansion of spring 88.

In actual practice, after the cocking piece is cocked, as seen in Fig. 9, the operator may freely pull the trigger rearwardly to the full limit of its movement without causing a release of the sear 9 or any movement of sear nose 8 relative to the sear notch on the cocking piece since the shoulder 80 projects from the rear face of part 70 instead of said rear face being grooved in the manner shown at 21 in Fig. 1, also, the angle of shoulder 80 is such as to hold nose 24 against counter clockwise movement thereof. The first effect of such retraction is to cause the upper nose 23 of the sear to move off ledge 20, and to cause lower nose 24 to engage the slanted face 80 of the strip 78 (Fig. 10). If the trigger is released, the upper nose 23 will ride back over the ledge 20 to the position shown in Fig. 9.

In order to fire the firearm, the position shown in Fig. 10 is reached, it is merely necessary to exert a slight upward pressure of the trigger finger on the trigger, whereupon the lower part 71 of the trigger will move upwardly a sufficient distance to permit the lip 79 to move into recess 83 under the force of spring 2 as transmitted through the sear, to the upper end of strip 78. As soon as the lip 79 is free to enter recess 83 it will immediately do so and the sear will instantly be released to rotate counter-clockwise, the position shown in Fig. 11, thereby releasing the cocking piece.

The angle of the face 80 on strip 78 may be changed to render the trigger more or less sensitive, but whatever angle may be determined upon, the firing mechanism is safe.

It is very pertinent to note that the full force of the main spring 2 is employed to release the sear. The small spring 50 need be merely strong enough to lift the sear so it will be elevated for cocking the piece. Its resistance to the spring 2 is negligible. There are no other springs counteracting the spring 2, and this spring normally exerts about a fourteen pound force in a standard Springfield rifle when compressed for actuating the cocking piece for firing. From this it is prime force, and when the cocking piece is released, its full power drives the cocking piece and firing pin after initially driving the sear counter-clockwise and out of the way of the sear nose element.

While it is true that a spring is usually provided, in conventional construction, that is intended to return the sear to full normal engagement with the sear notch if the operator does not wish to fire the piece after partial retraction of the trigger, there is no assurance that the sear will not stick close to a releasing position, and the sear actually does stick in a great many instances, whereupon an accidental jar of the firearm will result in effecting a release of the bolt or cocking piece with possible serious or fatal results.

Inasmuch as the sear in the present invention is not materially dislodged or moved from the sear notch, and as the spring that actuates the bolt or cocking piece for firing the firearm as the sole means for actuating the sear, it is obvious that no possible sticking of the sear can be effected irrespective of how carefully the operator attempts to move the trigger.

The movement necessary to release the sear from the cocking piece after the lower sear nose is in notch 21 may be controlled by the depth of the notch 21 and the contour of the outer end of lower nose 24. A well rounded nose and a shallow notch (assuming the other proportions and spacings are constant) will effect a quicker release than where the nose is sharper and the notch is deeper. Of course, variations in the relative positions of the other parts of the sear will also vary the degree of sensitivity of the sear to being released. It is preferable that a very slight further movement of the trigger, once the nose 24 is in notch 21, will result in sear 9 rotating out of the sear notch.

In further explanation of the trigger mechanism, if the sear nose 24 were sharp at its outer end, it would not move out of the notch 21 with the degree of movement possible in the illustrations, but being rounded, as the trigger is retracted (after nose 25 clears ledge 20) the force of spring 2 overcomes the holding force of the notch. It is important that the nose 24 engage the notch just before the upper nose 23 clears the ledge 20, although such engagement could be practically simultaneous with the movement of the nose 23 off ledge 20. The release of nose 24 from notch 21 under the influence of spring 2 is almost immediately after nose 25 clears ledge 20.

An added safety device is provided for holding the trigger against movement in either direction when the trigger 15 is in the position indicated in Figs. 1 to 4. This device consists of a lever 55 that is pivoted at 56 to the base plate 18 at about the juncture between the forward side of the trigger bow 19 and the said base plate.

One arm 57 of this lever is formed with an upwardly directed tooth 58 at its outer end that is adapted to be swung into a downwardly opening recess 59 in the forward side of trigger 15 when the latter is in the position seen in Fig. 7. When the said tooth 58 is in said recess the opposite end 60 of the lever is against the outer forward side of the trigger guard bow 19. Side pieces 61 are on the outer end of arm 60 which side pieces extend past the trigger guard bow to a position in which a finger on the trigger can engage the edges of said side pieces and move the lever to a released position in which the tooth 58 is out of the recess or notch 59, as seen in Fig. 8. A pair of opposed detents 62 are formed on sides 61 that are adapted to spring past the guard bow 19 when the lever 55 is in "safety" position for holding the said lever from accidentally moving to "released" position. The position of the safety lever and its contour is seen to be such that it is practically impossible that the lever could be accidentally actuated to release the trigger and, furthermore, the said safety lever is positioned for actuation by the trigger finger of the operator when said finger is in a position for engaging the trigger. It might also be added that the detents 62 function to prevent accidental return of the lever 55 to safety position, although it could not so return in any event after the trigger is slightly retracted. No claim is made to this construction.

As shown in Fig. 8, the upper side of the trigger guard, or base plate 18, is formed with a plurality of parallel grooves or cannelures 65 extending transversely of said plate and in a position directly over the trigger finger of the hand of a person when such finger is in trigger manipulating position.

These grooves may be formed directly in said base plate, or where such plate is smooth, as on a conventional rifle, a plate 63 carrying said grooves may be secured over the smooth plate by one or more screws 64.

The purpose of said grooves is to provide a friction surface adapted to be engaged by said trigger finger to facilitate holding the trigger retracted position without causing undesirable nervous or muscular tension.

When the trigger is retracted to the point where the nose 24 is in notch 21, it is manifest that a slight further retraction of the trigger will result in causing the rear to rotate out of the notch 21 and the firearm will be fired. However, the operator may not have a proper aim at this point, hence he must hold the trigger retracted until such aim is obtained. By merely pressing the trigger finger upwardly into engagement with the grooves 62 he is enabled to hold the trigger retracted almost indefinitely without muscular or nervous strain, and as soon as the desired aim is obtained, he can fire the piece by a slight further retraction of the trigger.

Figs. 9 to 15 show a modified form of this invention in which the finger engaging portion of the trigger is moved upwardly to effect a release of the sear after a predetermined retraction of said trigger instead of said portion continuing rearwardly.

This modified form is reconsidered by some riflemen, for safety reasons and because some find it preferable, after the trigger has been retracted to the position where further movement will release the sear, to effect such release by merely a slight upward roll or pressure of the trigger finger. Thus, an accidental full pull of the trigger, and nothing more, will not release the sear, but a full rearward pull and then a slight upward movement, will result in said release. This upward movement is not the same as a mere pressure of the finger against the grooves 65, as will later be apparent.

The same numerals will be used as for the invention as described in Figs. 1 to 8, inclusive, where the elements are identical.

In detail, the bolt 1, spring 2, sear notch element 3, faces 4, 5 on said element, partitions 6, sear 9, including all parts thereof; U-shaped member having arms 13 and block 26, are all idenobvious that the release of the trigger from the position shown in Fig. 10 without firing the piece will unfailingly result in restoration of the sear to the position shown in Fig. 9. In other words, the sear cannot possibly stick in the position shown in Fig. 10.

Figs. 16 to 21 inclusive, show a modification of the invention of Figs. 9 to 15 inclusive.

In this form of the invention the rifleman normally retracts the trigger its maximum distance upon bringing the rifle to his shoulder, and then, instead of immediately making the upward movement as described for the invention of Figs. 9 to 15, he relaxes the force applied to the trigger permitting the trigger to move slightly forward to a point where it encounters a definitely sensible resistance. Then a slight upward movement of the trigger finger on the trigger will result in releasing the sear from the cocking piece and the rifle will be fired.

In some instances there is a tendency for the marksman to maintain too high a tension on the trigger during the period of taking aim. Having the knowledge that piece will not be fired if the trigger is released, in the form of the invention illustrated in Figs. 9 to 15, the marksman sometimes will employ an unnecessary amount of force on the trigger to insure its being in a position where the upward movement of the trigger finger will cause a release of the sear. By releasing the force necessary to hold the trigger retracted just enough to allow it to move forward to the resistance stop all tension is removed and the marksman is capable of taking careful aim while in a resting position. If the marksman does not wish to fire, the trigger is fully released and will return to normal position. But if he wishes to fire, a slight upward force on the trigger by the trigger finger will immediately cause a firing of the piece when the trigger is in the position where its forward movement is resisted by the resistance stop.

In Figs. 16 to 21 the same numbers will be used as in Figs. 9 to 15 where the parts are identical, with those in the latter figures.

In Figs. 16 to 21 the U-member having arms 13 is identical with the same member shown in Figs. 9 to 15 except that the near arm 100 shown in Fig. 22 is formed with a notch 101 in its lower edge.

The trigger is itself in four main parts, the lower part 102 being identical with lower part 71 of Figs. 9 to 15 except that the nose piece 104 which corresponds generally with part 74 does not carry a spring at its upper end, and is separate from the lower part 102, as best seen in Fig. 22. This nose piece is urged upwardly a very small distance by a spring 103. This distance is so small that it will not urge the nose piece into notch 101, and the rear lower side of arm 13 that extends away from the notch is cut away or elevated slightly so that a full retraction of the trigger will cause the nose piece to be carried slightly past the notch to the position shown in Fig. 17 in which the nose piece is below the said lower rear side of arm 13.

The upper rear corner of the nose piece is square, as seen in Fig. 22, hence when it is below the rear lower corner of notch 101 the trigger cannot be moved upwardly.

Upon releasing the trigger so that it will move forwardly, the upper forward corner of the nose piece 104 will strike the lower forward corner of notch 101 (Fig. 22) thus giving a clear indication that the nose piece is in a position where the trigger can be moved upwardly (Fig. 18). This upper forward corner of the nose piece is beveled as indicated at 105, which will result in the nose piece being moved downwardly in the event the trigger is fully released, thus restoring the firearm to the normally cocked position with the trigger all the way forward.

In the event the operator wishes to fire the firearm, he merely exerts a slight upward force on the trigger and the nose piece will readily slide into notch 101. The rear side of said nose piece is formed with a recess 106 adapted to receive the lip 79 on strip 78, as described for Figs. 9 to 15, and the sear will instantly rotate counter-clockwise to the position shown in Fig. 19 releasing the sear from the cocking piece and permitting the firing of the piece.

In this form of the invention, as with others, there is first a movement of the sear rearwardly upon retracting the trigger, which rearward movement is accompanied by a slight rocking of the sear upwardly. Fig. 17 shows the sear rocked upwardly slightly as distinguished from its position in Fig. 18, the latter showing the sear in the normally cocked position with respect to the sear notch, although the trigger is partially retracted. Thus, there is no gradual drawing of the sear out of engagement with the sear notch, as in conventional firearms. When the sear rotates out of cocked position it does so under the influence of the strong spring 2 that exerts about a fourteen pound pressure in the U. S. Springfield rifle. Until it moves out of engagement with the sear notch it always has at least its normal engagement therewith, and yet a full normal retraction of the trigger under the conventional three and one-half pound pull on the trigger is used to bring the trigger into operating position for firing the piece. Thus, the firing mechanism is absolutely safe.

The term "cocking piece" as used herein is intended to include the firing pin and bolt, or hammer, inasmuch as they function together as a unit for exploding the detonator or cap of the cartridge when the bolt or hammer is released. Also, this nomenclature is used in official descriptions of the 1903 model U. S. Springfield rifle.

While the movement of the sear has been hereinbefore described, it is pertinent to note that in all forms of the invention its initial movement is substantially in translation upon retraction of the trigger and under the influence of the latter, to a certain point where the nose 23 of the sear 9 moves off the 20 of the trigger and the lower nose 24 engages notch 21 (Fig. 3) or where nose 24 engages surface 80 (Fig. 10) without materially changing the degree of engagement between the sear and the sear notch element, and then upon a predetermined additional movement of the trigger there is a fast and irrevocable movement of the sear in rotation under the influence of the strong spring that drives the cocking piece for firing the cartridge. With all forms of the invention there is no question about when the end of the movement in translation is reached or when the point is reached where a certain further movement of the trigger will result in transferring the activation of the sear from the influence of the trigger to the influence of the main power spring of the cocking piece. In all forms of the invention the power spring that drives the cocking piece tends to resist the movement of the sear in translation under the influence of the trigger and by the trigger finger, and will return the sear and trigger to the normal cocked position (Figs. 2, 9, 16) of the sear relative to the trigger when the latter is in its full forward position.

The use of the term "firearm" herein is intended to cover all small bore guns, whether the projectile is air, spring or powder propelled.

I claim:

1. In a firing mechanism having a cocking piece and a spring energized by movement of said cocking piece to cocked position for driving the latter upon release of said piece from said position, holding means for releasably holding said cocking piece in said position movable successively in translation and in rotation for releasing said cocking piece, means supporting said holding means for said movement, means for causing said movement, said holding means comprising a sear formed with an upstanding nose and sear notch element depending from said cocking piece adapted to releasably engage said nose, and the means for causing movement of said holding means in rotation including said spring.

2. In a firing mechanism having a reciprocably mounted cocking piece and a spring energized by movement of said cocking piece to cocked position for driving the latter rectilinearly upon release of said piece from said position, holding means for holding said cocking piece in said position, means including said spring and a finger actuated trigger for moving said holding means from a position holding said cocking piece cocked to a position freeing said spring and cocking piece for driving of the latter by said spring, said holding means comprising a sear adapted to releasably engage said cocking piece, means supporting said sear for movement substantially in translation and then in rotation to said position freeing said spring and cocking piece upon movement of said trigger under the pressure of the trigger finger of the hand for effecting retraction of said trigger, and means for holding said sear in engagement with said cocking piece and in holding relation to the latter until said rotation of said sear.

3. In a firing mechanism having a reciprocably mounted cocking piece and a spring energized by movement of said cocking piece to cocked position for driving the latter rectilinearly upon release of said piece from said position, holding means for holding said cocking piece in said position, means including said spring and a finger actuated trigger for moving said holding means from a position holding said cocking piece cocked to a position freeing said spring and cocking piece for driving of the latter by said spring, said holding means and said trigger having means therein movable into engaging relationship with each other for resisting retractive movement of said trigger to a point just prior to the transition point between said movement of said sear in translation and rotation whereby the operator will be physically apprised of the fact that further movement of said trigger will cause a firing of the firearm.

4. In a firing mechanism having a cocking piece supported for reciprocation and a spring energized by movement of said cocking piece in one direction to cocked position for driving the latter in the opposite direction upon release of said cocking piece from said position, a sear movable into holding engagement with said cocking piece when the latter is cocked for holding said cocking piece cocked, a trigger in engagement with said sear for holding the latter in said holding engagement with said cocking piece, means supporting said trigger for retraction under the influence of a trigger finger and against the influence of said spring, means supporting said sear for rectilinear movement during retractable movement of said trigger to a predetermined point in said movement of the latter and said sear being so movable by said trigger during said movement of the trigger to said point, said sear being rotatable out of engagement with said cocking piece at said point and means supporting said sear for such rotation, means for holding said sear against rotation and against disengagement from said cocking piece during movement of said trigger to said point.

5. In a firing mechanism having a cocking piece supported for reciprocation and a spring energized by movement of said cocking piece in one direction to cocked position for driving the latter in the opposite direction upon release of said cocking piece from said position, a sear movable into holding engagement with said cocking piece when the latter is cocked for holding said cocking piece cocked, a trigger in engagement with said sear for holding the latter in said holding engagement with said cocking piece, means supporting said trigger for retraction under the influence of a trigger finger and against the influence of said spring, means supporting said sear for rectilinear movement during retractable movement of said trigger to a predetermined point in said movement of the latter and said sear being so movable by said trigger during said movement of the trigger to said point, said sear being rotatable out of engagement with said cocking piece at said point and means supporting said sear for such rotation, means for holding said sear against rotation and against disengagement from said cocking piece during movement of said trigger to said point, means including said spring for causing said rotation of said sear at said point.

6. In a firing mechanism having a cocking piece supported for reciprocation and a spring energized by movement of said cocking piece in one direction to cocked position for driving the latter in the opposite direction upon release of said cocking piece from said position, a sear movable into holding engagement with said cocking piece when the latter is cocked for holding said cocking piece cocked, a trigger in engagement with said sear for holding the latter in said holding engagement with said cocking piece, means supporting said trigger for retraction under the influence of a trigger finger and against the influence of said spring, means supporting said sear for rectilinear movement during retractable movement of said trigger to a predetermined point in said movement of the latter and said sear being so movable by said trigger during said movement of the trigger to said point, said sear being rotatable out of engagement with said cocking piece at said point and means supporting said sear for such rotation, means for holding said sear against rotation and against disengagement from said cocking piece during movement of said trigger to said point, means including said spring for holding said sear against said trigger to said point in the movement of the latter.

7. In a firing mechanism having a cocking piece and a spring energized by movement of said piece to cocked position for driving the latter upon release of said piece from said position, a finger actuated trigger having a portion retractable in one direction by a substantially rectilinear retractable movement of the trigger finger of a hand in a similar direction, means supporting said portion for said retractable movement and for generally vertical movement substantially normal to said retractable movement at a point in the path of said portion upon a corresponding generally vertical movement of said finger at said point, movable means for releasably holding said cocking piece in said cocked position, releasing means actuated by said vertical movement of said portion for releasing said movable means to permit release of said cocking piece.

8. In a firing mechanism having a trigger oscillatably supported for movement under the pressure of the trigger finger of an operator from a forward position to a retracted position, a manually retractable cocking piece movable from an uncocked to a cocked position independently of movement of said trigger upon manual retraction of said cocking piece, a spring energized by said movement of said cocking piece to said cocked position, a sear engageable by said cocking piece upon movement of the latter to cocked position for releasably holding said cocking piece in said cocked position, said sear being supported for movement successively in translation and in rotation for releasing said cocking piece and means on said trigger movable therewith in engagement with said sear for causing said movement of said sear successively in translation and rotation upon retractive movement of said trigger.

9. In a firing mechanism having a cocking piece and a spring energized by movement of said cocking piece to cocked position for driving the latter upon release of said piece from said position, a manually retractable cocking piece, a sear releasably engageable with said cocking piece upon manual retraction of the latter for releasably holding said cocking piece cocked, means supporting said sear for rotation from its holding position holding said cocking piece cocked to a position releasing the latter, a manually retractable trigger supported for retractive movement under pressure of the trigger finger from a forward position to a retracted position, means carried by said trigger for movement therewith engageable by said sear for releasably securing said sear in its holding position when said trigger is in its said forward position and for releasing said sear from said holding position upon retractive movement of said trigger a predetermined distance, and said spring being common to said cocking piece and said sear for simultaneously rotating said sear out of engagement into said cocking piece and for driving said cocking piece upon retraction of said trigger to a predetermined point.

JOHN H. GARTNER.

REFERENCES CITED

The following references are of record in the file of this patent:

UNITED STATES PATENTS

| Number | Name | Date |
|---|---|---|
| 2,063,476 | Wilson | Dec. 8, 1936 |
| 2,249,231 | Smith | July 15, 1941 |
| 2,347,645 | Sherrer et al. | May 2, 1944 |